United States Patent
Asghari et al.

(10) Patent No.: US 12,025,749 B2
(45) Date of Patent: Jul. 2, 2024

(54) LIDAR SYSTEM GENERATING MULTIPLE LIDAR OUTPUT SIGNALS

(71) Applicant: SiLC Technologies, Inc., Monrovia, CA (US)

(72) Inventors: Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 835 days.

(21) Appl. No.: 16/590,339

(22) Filed: Oct. 1, 2019

(65) Prior Publication Data

US 2020/0116837 A1    Apr. 16, 2020

Related U.S. Application Data

(60) Provisional application No. 62/745,225, filed on Oct. 12, 2018, provisional application No. 62/784,111, filed on Dec. 21, 2018.

(51) Int. Cl.
*G01S 7/4913*   (2020.01)
*G01S 7/40*   (2006.01)
(Continued)

(52) U.S. Cl.
CPC ............ *G01S 7/4913* (2013.01); *G01S 7/406* (2021.05); *G01S 7/4802* (2013.01);
(Continued)

(58) Field of Classification Search
CPC .................................................. G01S 7/4917
See application file for complete search history.

(56) References Cited

U.S. PATENT DOCUMENTS 4,845,703 A * 7/1989 Suzuki ............... H04Q 11/0005
398/48
8,541,744 B1  9/2013 Liu
(Continued)

FOREIGN PATENT DOCUMENTS

| CN | 107192355 B | 8/2019 |
| CN | 112241014 A | 1/2021 |
| WO | 2018/160240 A1 | 9/2018 |

OTHER PUBLICATIONS

Kang, Sung Chul, International Search Report and Written Opinion, Korean Intellectual Property Office, PCT/US2019/054153, Jan. 17, 2020.

(Continued)

*Primary Examiner* — Yuqing Xiao
*Assistant Examiner* — Zhengqing Qi
(74) *Attorney, Agent, or Firm* — Gavrilovich, Dodd & Lindsey LLP

(57) ABSTRACT

A LIDAR system includes a light source configured to generate an outgoing light signal that includes multiple channels that are each of a different wavelength. The system includes optical components that generate composite light signals. Each composite light signal includes light from a LIDAR input signal combined with light from a reference signal. The LIDAR input signals each includes light that was reflected by an object located apart from the system and that was included also in one of the channels. The reference signals do not include light that was reflected by the object but include light from one of the channels. Each of the composite signals is generated such that the reference signal and the LIDAR input included in the composite signal includes light from the same channel.

14 Claims, 8 Drawing Sheets

(51) Int. Cl.

| | | |
|---|---|---|
| *G01S 7/48* | (2006.01) | |
| *G01S 7/481* | (2006.01) | |
| *G01S 7/486* | (2020.01) | |
| *G01S 7/4865* | (2020.01) | |
| *G01S 7/4911* | (2020.01) | |
| *G01S 7/4912* | (2020.01) | |
| *G01S 7/499* | (2006.01) | |
| *G01S 17/00* | (2020.01) | |
| *G01S 17/08* | (2006.01) | |

(52) U.S. Cl.
CPC .......... *G01S 7/4804* (2013.01); *G01S 7/4812* (2013.01); *G01S 7/4818* (2013.01); *G01S 7/4865* (2013.01); *G01S 7/4868* (2013.01); *G01S 7/4911* (2013.01); *G01S 7/4917* (2013.01); *G01S 7/499* (2013.01); *G01S 17/00* (2013.01); *G01S 17/08* (2013.01)

(56) References Cited

U.S. PATENT DOCUMENTS

| | | | | |
|---|---|---|---|---|
| 8,558,993 | B2 | 10/2013 | Newbury et al. | |
| 9,310,487 | B2* | 4/2016 | Sakimura et al. | G01S 17/102 |
| 9,857,468 | B1* | 1/2018 | Eichenholz et al. | G01S 17/06 |
| | | | | 356/5.01 |
| 10,605,901 | B2* | 3/2020 | Lee et al. | G01S 7/4817 |
| 2012/0206712 | A1* | 8/2012 | Chang | G01S 17/87 |
| | | | | 356/28 |
| 2014/0153931 | A1* | 6/2014 | Doerr | H04B 10/541 |
| | | | | 398/135 |
| 2015/0109603 | A1 | 4/2015 | Kim et al. | |
| 2016/0291135 | A1* | 10/2016 | Ando | G01S 7/4811 |
| 2017/0146641 | A1 | 5/2017 | Walsh et al. | |
| 2018/0031680 | A1* | 2/2018 | Lee | G01S 7/4817 |
| 2018/0120433 | A1 | 5/2018 | Eichenholz et al. | |
| 2018/0136321 | A1 | 5/2018 | Verghese et al. | |
| 2019/0004151 | A1* | 1/2019 | Abediasl et al. | G01S 7/481 |
| 2019/0257927 | A1* | 8/2019 | Yao | G01S 7/4863 |
| 2020/0142065 | A1* | 5/2020 | Boloorian et al. | G01S 17/32 |

OTHER PUBLICATIONS

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Pilot Photonics, Lyra OCS 1000, Optical comb laser module, Retrieved on Nov. 20, 2019 from Pilot Photonics: http://www.pilotphotonics.com/optical-frequency-comb-source/.

Van Acoleyen et al., "Two-Dimensional Dispersive Off-Chip Beam Scanner Fabricated on Silicon-On-Insulator", 2011, IEEE Photon. Technol. Lett., 23, 1270-1272.

Velodyne, HDL-64E S2 Datasheet, 2017. Retrieved from http://velodynelidar.com/lidar/products/brochure/HDL-64E%20S2%20datasheet_2010_lowres.pdf.

Nakamura, Yukari, International Preliminary Report on Patentability and Written Opinion, the International Bureau of WIPO, PCT/US2019/054153, Apr. 22, 2021.

Leee, Sun Hwa, International Preliminary Report on Patentability and Written Opinion, the International Bureau of WIPO, PCT/US19/57500, May 14, 2021.

Young, Lee, International Search Report and Written Opinion, United States Patent and Trademark Office, PCT/US19/57500, Jan. 16, 2020.

Zhu et al., "Dual-Comb Ranging", Engineering, 4, Oct. 26, 2018, pp. 772-778.

* cited by examiner

LIDAR SYSTEM GENERATING MULTIPLE LIDAR OUTPUT SIGNALS

RELATED APPLICATIONS

This application claims the benefit of U.S. Provisional Patent Application Ser. No. 62/745,225, filed on Oct. 12, 2018, entitled "Optical Sensor System," and U.S. Provisional Patent Application Ser. No. 62/784,111, filed Dec. 21, 2018 and incorporated herein in their entirety. This application is related to PCT Application No. PCT/US19/54153, filed Oct. 1, 2019.

FIELD

The invention relates to optical devices. In particular, the invention relates to Light Detection and Ranging (LIDAR) systems.

BACKGROUND

LIDAR technologies are being applied to a variety of applications. LIDAR specifications typically specify that LIDAR data be generated for a minimum number of sample regions in a field of view. LIDAR specifications also specify the distance of those sample regions from the LIDAR signal source and a re-fresh rate. The re-fresh rate is the frequency at which the LIDAR data is generated for all of the sample regions in the field of view. The ability of the given LIDAR system to generate the LIDAR data for the sample regions in the field of view becomes more difficult as the distance to the sample regions increases and as the refresh rate increases.

As LIDAR is being adapted to applications such as self-driving-vehicles, it becomes more desirable to generate LIDAR data for larger fields of view, increasing numbers of points, further distances, and at faster re-fresh rates. As a result, there is a need for a LIDAR system that capable of generating LIDAR data for larger numbers of sample regions.

SUMMARY

A LIDAR system includes a light source configured to generate an outgoing light signal that includes multiple channels that are each of a different wavelength. The system includes optical components that generate composite light signals. Each composite light signal includes light from a LIDAR input signal combined with light from a reference signal. The LIDAR input signals each includes light that was reflected by an object located apart from the system and that was included also in one of the channels. The reference signals do not include light that was reflected by the object but include light from one of the channels. Each of the composite signals is generated such that the reference signal and the LIDAR input included in the composite signal includes light from the same channel.

Another LIDAR system includes a light source configured to generate an outgoing light signal that includes multiple channels that each has a different wavelength. The system is configured to output multiple LIDAR output signals that each carries one of the channels. The system is also configured to receive multiple LIDAR input signals that have each been reflected by an object located outside of the LIDAR system and that each carries light from a different one of the LIDAR output signals. The system also includes electronics configured to tune the light source such that the frequency of each of the channel LIDAR output signals changes concurrently.

Another LIDAR system includes a light source configured to generate an outgoing light signal that includes multiple channels that each has a different wavelength. The system is configured to output multiple LIDAR output signals that each carries one of the channels. The system is also configured to receive multiple LIDAR input signals that have each been reflected by an object located outside of the LIDAR system and that each carries light from a different one of the LIDAR output signals. The system also includes a demultiplexing component that receives light from the outgoing light signal and is configured to separate the received light into the LIDAR output signals such that each LIDAR output signal exits from the demultiplexing component traveling in a different direction through free space.

BRIEF DESCRIPTION OF THE FIGURES

FIG. 7A illustrates an example of a processing unit.

FIG. 8A is a graph of frequency versus time illustrating a scheme for tuning the LIDAR output signals.

FIG. 8B provides another example of a schematic of electronics that are suitable for use with a processing unit constructed according to FIG. 7A.

FIG. 8C is a graph of magnitude versus frequency. A solid line on the graph shows results for a Complex Fourier transform.

DESCRIPTION

The LIDAR system concurrently generates an outgoing light signal that includes multiple channels that are each of a different wavelength. The different channels are directed to different sample regions in a field of view and LIDAR data (distance and/or radial velocity between the source of a LIDAR output signal and a reflecting object) is generated for each region of the field of view. The concurrent use of multiple different channels to generate LIDAR data accelerates the generation of LIDAR data for a field of view and accordingly allows the LIDAR specifications to be satisfied for applications that require larger fields of view, increased numbers of sample regions, further field of view distances, and lower re-fresh rates.

Figure 1A:
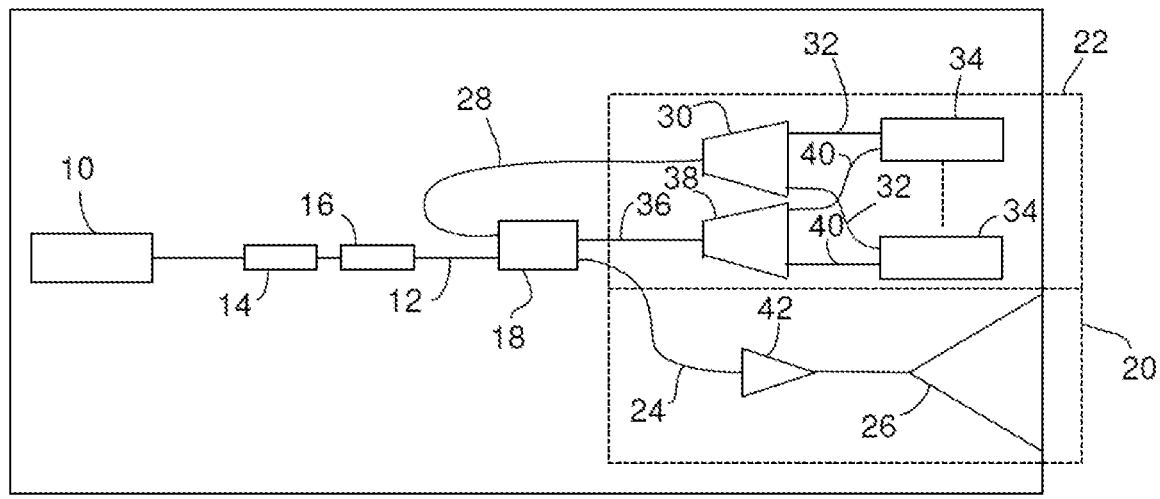
FIG. 1A is a schematic of a LIDAR system.

FIG. 1A is a schematic of a LIDAR system. The system includes a light source 10 such as a laser that outputs an outgoing light signal. The outgoing light signal includes multiple different channels that are each at a different wavelength. The wavelengths of the channels can be periodically spaced in that the wavelength increase from one channel to the next channel is constant or substantially constant. A suitable light source 10 for generating multiple channels with periodically spaced wavelengths and/or frequencies includes, but is not limited to, comb lasers (lasers with a frequency comb) and multiple single wavelength lasers multiplexed into to single optical waveguide, sources such as that described in U.S. patent application Ser. No. 11/998,846, filed on Nov. 30, 2017, granted patent number 7542641, entitled "Multi-Channel Optical Device," and incorporated herein in its entirety.

The LIDAR system also includes a utility waveguide 12 that receives an outgoing light signal from the light source 10. A modulator 14 is optionally positioned along the utility waveguide 12. The modulator 14 is configured to modulate the power of the outgoing light signal and accordingly the LIDAR output signal(s). The electronics can operate the modulator 14. Accordingly, the electronics can modulate the power of the outgoing light signal and accordingly the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. Patent application serial number 617,810, filed on Sep. 21 1993, entitled Integrated Silicon PIN Diode Electro-Optic Waveguide, and incorporated herein in its entirety.

An amplifier 16 is optionally positioned along the utility waveguide 12. Since the power of the outgoing light signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing light signal from the modulator 14 to a signal-directing component 18. The signal-directing component 18 can direct the outgoing light signal to a LIDAR branch 20 and/or a data branch 22. The LIDAR branch outputs LIDAR output signals and receives LIDAR input signals. The data branch processes the LDAR input signals for the generation of LIDAR data (distance and/or radial velocity between the source of the LIDAR output signal and a reflecting object).

The LIDAR branch includes a LIDAR signal waveguide 24 that receives at least a portion of the outgoing light signal from the signal-directing component 18. The LIDAR signal waveguide 24 carries at least a portion of the outgoing light signal to a demultiplexing component 26. When the outgoing light signal includes multiple different channels at different wavelengths, the demultiplexing component 26 separates the outgoing light signal into multiple LIDAR output signals that are each at a different wavelength (channel) and are directed to different sample regions in a field of view. The demultiplexing component 26 outputs the LIDAR output signals which can be reflected by a reflecting object (not shown) located outside of the LIDAR system. The reflected LIDAR output signals return to the demultiplexing component 26 as LIDAR input signals. The demultiplexing component 26 combines the LIDAR input signals and outputs the result on the LIDAR signal waveguide 24 as an incoming light signal.

In some instances, the demultiplexing component 26 also includes beam steering functionality. In these instances, the demultiplexing component 26 can be in electrical communication with electronics (not shown) that can operate the demultiplexing component 26 so as to steer the LIDAR output signals to different sample regions in a field of view. The demultiplexing component 26 and/or electronics can be configured such that the different LIDAR output signals are steered independently or are steered concurrently.

Although the demultiplexing component 26 is illustrated as a single component, the demultiplexing component 26 can include multiple optical components and/or electrical components. Suitable demultiplexing components 26 include, but are not limited to, optical phased arrays (OPAs), transmission diffraction gratings, reflection diffraction gratings, and Diffractive Optical Elements (DOE). Suitable demultiplexing components 26 with beam steering capability include, but are not limited to, optical phased arrays (OPAs) with active phase control elements on the array waveguides.

The LIDAR signal waveguide 24 carries the incoming light signal to the signal-directing component 18. The signal-directing component 18 directs the incoming light signal to the utility waveguide 12 and/or a comparative signal waveguide 28. The portion of the incoming light signal-directed to the comparative signal waveguide 28 serves a comparative incoming light signal.

The comparative signal waveguide 28 carries the comparative incoming light signal to a comparative demultiplexer 30. When the comparative light signal includes multiple channels, the comparative demultiplexer 30 divides the comparative incoming light signal into different comparative signals that each has a different wavelength. The comparative demultiplexer 30 outputs the comparative signals on different comparative waveguides 32. The comparative waveguides 32 each carry one of the comparative signals to different processing components 34.

The signal-directing component 18 is configured such that when the signal-directing component 18 directs at least a portion of the incoming light signal to the comparative waveguide 32, the signal-directing component 18 also directs at least a portion of the outgoing light signal to a reference signal waveguide 36. The portion of the outgoing light signal received by the reference signal waveguide 36 serves as a reference light signal.

The reference signal waveguide 36 carries the reference light signal to a reference demultiplexer 38. When the reference light signal includes multiple channels, the reference demultiplexer 38 divides the reference light signal into different reference signals that each has a different wavelength. The reference demultiplexer 38 outputs the reference signals on different reference waveguides 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the corresponding reference signal of the same wavelength are received at the same processing component 34.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data for the sample region.

The signal-directing component 18 can be an optical coupler. When the signal-directing component 18 is an optical coupler, the signal-directing component 18 directs a first portion of the outgoing light signal to the LIDAR signal waveguide 24 and a second portion of the outgoing light signal to the reference signal waveguide 36 and also directs a first portion of the incoming light signal to the utility waveguide 12 and a second portion of the incoming light signal to the comparative signal waveguide 28. Accordingly, the second portion of the incoming light signal can serve as the comparative incoming light signal and the second portion of the outgoing light signal can serve as the reference light signal.

The signal-directing component 18 can be an optical switch such as a cross-over switch. A suitable cross-over switch can be operated in a cross mode or a pass mode. In the pass mode, the outgoing light signal is directed to the LIDAR signal waveguide 24 and an incoming light signal would be directed to the utility waveguide 12. In the cross mode, the outgoing light signal is directed to the reference signal waveguide 36 and the incoming light signal is directed to the comparative signal waveguide 28. Accordingly, the incoming light signal or a portion of the incoming light signal can serve as the comparative light signal and the outgoing light signal or a portion of the outgoing light signal can serve as the reference light signal.

An optical switch such as a cross-over switch can be controlled by the electronics. For instance, the electronics can control operate the switch such that the switch is in the cross mode or a pass mode. When the LIDAR output signal is to be transmitted from the LIDAR system, the electronics operate the switch such that the switch is in the pass mode. When the LIDAR input signal is to be received by the LIDAR system, the electronics operate the switch such that the switch is in the cross-over mode. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch. As a result, the processing components 34 can each combine a comparative signal with the corresponding reference signal.

In some instances, an optical amplifier 42 is optionally positioned along the LIDAR signal waveguide 24 and is configured to provide amplification of the outgoing light signal and/or of the incoming light signal. Accordingly, the effects of optical loss at the signal-directing component 18 can be reduced.

Figure 1B:
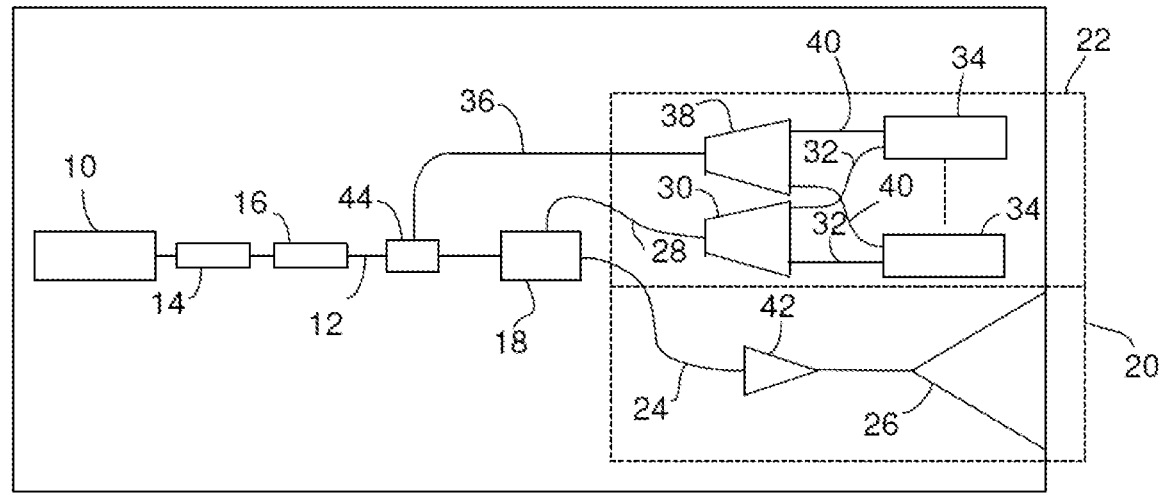
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing light signal is directed to the LIDAR signal waveguide 24 and the incoming light signal is directed to the comparative signal waveguide 28. The comparative signal waveguide 28 carries the comparative incoming light signal to the comparative demultiplexer 30. Additionally, a tap component 44 is positioned along the utility waveguide 12. The tap component 44 is configured to tap off a first portion of the outgoing light signal such that the first portion of the outgoing light signal is received on the reference signal waveguide 36. The first portion of the outgoing light signal received by the reference signal waveguide 36 serves as the reference light signal. The reference signal waveguide 36 carries the reference light signal to the reference demultiplexer 38. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Light from a laser source is typically linearly polarized and hence the LIDAR output signal is also typically linearly polarized. Reflection from a target may change the angle of polarization of the returned light. Accordingly, the LIDAR input signal can include light of different linear polarization states. For instance, a first portion of a LIDAR input signal can include light of a first linear polarization state and a second portion of a LIDAR input signal can include light of a second linear polarization state. The intensity of the resulting composite signals is proportional to the square of the cosine of the angle between the comparative and reference signal polarizations. If the angle is 90 degrees, the LIDAR data can be lost in the resulting composite signal. As a result, the LIDAR system can be modified to compensate for changes in polarization state of the LIDAR output signal.

Figure 2:
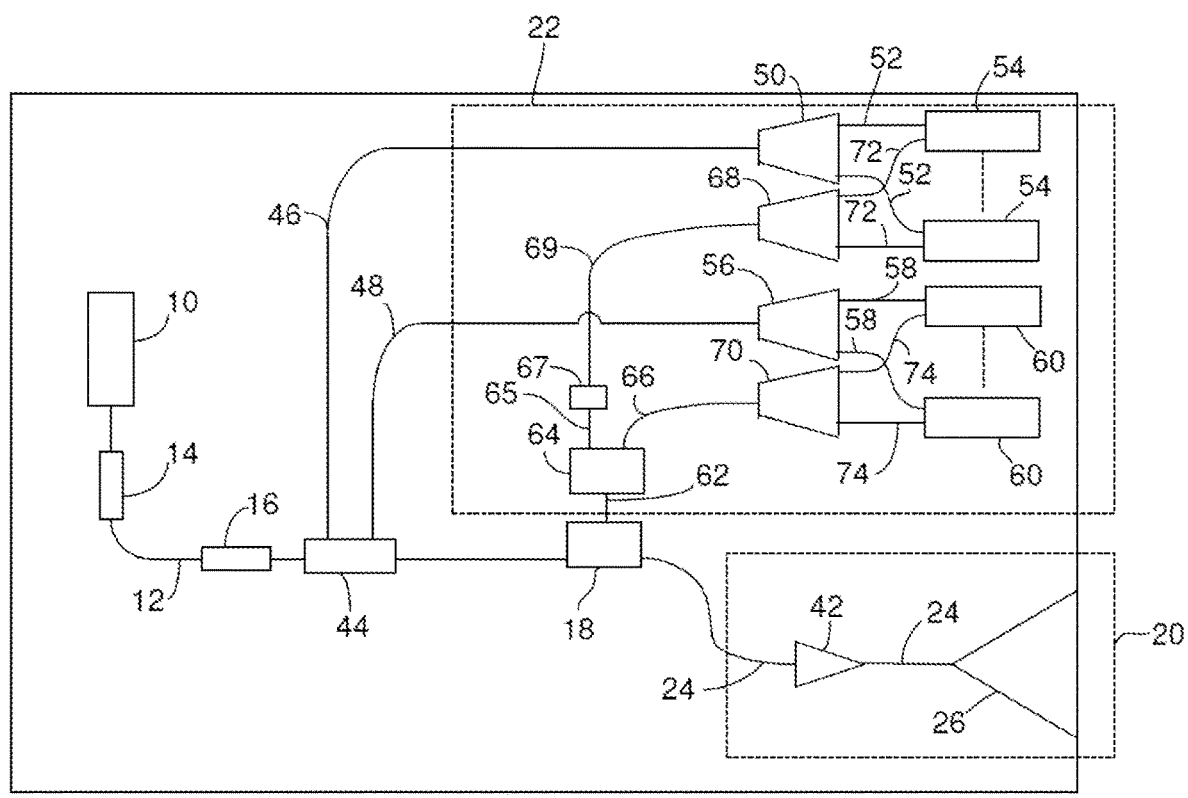
FIG. 2 is a schematic of another embodiment of a LIDAR system.

FIG. 2 is a schematic of the LIDAR system of FIG. 1A and/or FIG. 1B modified to compensate for changes in the polarization state of the LIDAR output signal. A tap component 44 is positioned along the utility waveguide 12. The tap component 44 is configured to tap off a first portion of the outgoing light signal such that the first portion of the outgoing light signal is received on a first reference signal waveguide 46. The first portion of the outgoing light signal received by the first reference signal waveguide 46 serves as a first reference light signal. The tap component 44 is also configured to tap off a second portion of the outgoing light signal such that the second portion of the outgoing light signal is received on a second reference signal waveguide 48. The second portion of the outgoing light signal received by the second reference signal waveguide 48 serves as a second reference light signal.

The first reference signal waveguide 46 carries the first reference light signal to a first reference demultiplexer 50. When the first reference light signal includes multiple channels, the first reference demultiplexer 50 divides the first reference light signal into different first reference signals that each has a different wavelength. The first reference demultiplexer 50 outputs the first reference signals on different first reference waveguides 52. The first reference waveguides 52 each carry one of the first reference signals to one several first processing components 54.

The second reference signal waveguide 48 carries the second reference light signal to a second reference demultiplexer 56. When the second reference light signal includes multiple channels, the second reference demultiplexer 56 divides the second reference light signal into different second reference signals that each has a different wavelength. The second reference demultiplexer 56 outputs the second reference signals on different second reference waveguides 58. The second reference waveguides 58 each carry one of the second reference signals to one of several second processing components 60.

The utility waveguide 12 carries the outgoing light signal to the signal-directing component 18. The signal-directing component 18 directs the outgoing light signal to the LIDAR signal waveguide 24. The LIDAR signal waveguide 24 receives the incoming light signal from the demultiplexing component 26 and carries the incoming light signal to the signal-directing component 18. The signal-directing component 18 directs the incoming light signal to an intermediate waveguide 62. Suitable signal-directing components 18 include, but are not limited to, circulators, 2×2 optical couplers, 1×2 optical couplers, and switches.

The intermediate waveguide 62 carries the received portion of the incoming light signal to a beamsplitter 64. The beamsplitter 64 splits the beam into a precursor comparative incoming signal and a second comparative incoming signal. The precursor comparative incoming signal is received on a precursor comparative signal waveguide 65 and the second comparative incoming signal is received on a second comparative signal waveguide 66. The precursor comparative signal waveguide 65 carries the precursor comparative incoming signal to a polarization rotator 67. The polarization rotator outputs a first comparative incoming signal that is received on a first comparative signal waveguide 69. The first comparative signal waveguide 69 carries the first comparative incoming signal to a first comparative demultiplexer 68 and the second comparative signal waveguide 66 carries the second comparative incoming signal to a second comparative demultiplexer 70.

When the first comparative incoming light signal includes multiple channels, the first comparative demultiplexer 68 divides the first comparative incoming light signal into different first comparative signals that each has a different wavelength. The first comparative demultiplexer 68 outputs the first comparative signals on different first comparative waveguides 72. The first comparative waveguides 72 each carry one of the first comparative signals to a different first processing component 54.

When the second comparative light signal includes multiple channels, the second comparative demultiplexer 70 divides the first comparative incoming light signal into different second comparative signals that each has a different wavelength. The second comparative demultiplexer 70 outputs the second comparative signals on different second comparative waveguides 74. The second comparative waveguides 74 each carry one of the second comparative signals to a different second processing component 60.

The first comparative waveguides 72 and the first reference waveguides 52 are configured such that a comparative signal and the corresponding reference signal are received at the same first processing component 54. For instance, the first comparative waveguides 72 and the first reference waveguides 52 are configured such that the first comparative signal and the first reference signal of the same wavelength are received at the same first processing component 54.

The second comparative waveguides 74 and the second reference waveguides 58 are configured such that a comparative signal and the corresponding reference signal are received at the same second processing component 60. For instance, the second comparative waveguides 74 and the second reference waveguides 58 are configured such that the second comparative signal and the second reference signal of the same wavelength are received at the same second processing component 60.

The first processing components 54 each combines a first comparative signal with the corresponding first reference signal to form a first composite signal that carries LIDAR data for a sample region on the field of view. The second processing components 60 each combines a second comparative signal with the corresponding second reference signal to form a second composite signal that carries LIDAR data for a sample region on the field of view.

The LIDAR system is constructed such that the first comparative signals have the same polarization angle as the corresponding second comparative signals. For instance, the beamsplitter 64 can be a polarizing beam splitter. One example of a polarizing beamsplitter is constructed such that the channels in the precursor comparative incoming signal have a first polarization state but do not have or do not substantially have a second polarization state and the channels in the second comparative incoming signal have a second polarization state but do not have or do not substantially have the first polarization state. For instance, the polarizing beamsplitter can route a portion of the incoming light signal having the first polarization state to the precursor comparative signal waveguide 65 and a portion of the incoming light signal having the second polarization state to the second comparative signal waveguide 66. The first polarization state and the second polarization state can be linear polarization states and the second polarization state is different from the first polarization state. For instance, the first polarization state can be TE and the second polarization state can be transverse magnetic (TM) or the first polarization state can be TM and the second polarization state can be transverse electric (TE). Suitable beamsplitters include, but are not limited to, Wollaston prisms, microelectromechancial (MEMs) based polarizing beamsplitters and integrated optical polarizing beamsplitters using asymmetric y-branches, Mach-Zehnder interferometers and multi-mode interference couplers.

The polarization rotator can be configured to change the polarization state of the channels in the precursor comparative incoming signal from the first polarization state to the second polarization state. As a result, the channels in the first comparative incoming signal have the second polarization state but do not have or do not substantially have the first polarization state. Accordingly, the channels in the first comparative incoming signal and the corresponding channels in the second comparative incoming signal each have the same polarization state (the second polarization state in this discussion). The first comparative signals that result from the first comparative incoming signal have the same polarization angle as the corresponding second comparative signals that result from the second comparative incoming signal. Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the LIDAR output signal(s) are linearly polarized, the first reference signals can have the same linear polarization angle as the corresponding second reference signals. For instance, the first reference signals and the second reference signals can each have the same polarization state as the first comparative incoming signal and the second comparative incoming signal. Accordingly, the first comparative signals, the second comparative signals, the first reference signals, and the second reference signals can each have the same polarization state. In this example, the first comparative signals, the second comparative signals, the first reference signals, and the second reference signals can each have light of the second polarization state.

As a result of the above configuration, the first composite signals each results from combining a reference signal and a comparative signal of the same polarization state and will accordingly provide the desired beating between the reference signal and the comparative signal. For instance, the first composite signals each result results from combining a reference signal and a comparative signal of the first polarization state and excludes or substantially excludes light of the second polarization state or the first composite signals each result results from combining a reference signal and a comparative signal of the second polarization state and excludes or substantially excludes light of the first polarization state. Similarly, the second composite signals each includes a reference signal and a comparative signal of the same polarization state will accordingly provide the desired beating between the reference signal and the comparative signal. For instance, the second composite signals each result from combining a reference signal and a comparative signal of the first polarization state and excludes or substantially excludes light of the second polarization state or the first composite signals each results from combining a reference signal and a comparative signal of the second polarization state and excludes or substantially excludes light of the first polarization state.

The above configuration results in the LIDAR data for a single sample region in the field of view being present in multiple different composite signals (i.e., the first composite signals and the second composite signal) generated for the sample region. In some instances, determining the LIDAR data for the sample region includes the electronics combining the LIDAR data from different composite signals (i.e., the first composite signals and the second composite signal). Combining the LIDAR data can include taking a sum, average, median, or mode of the LIDAR data generated from multiple different composite signals. For instance, the electronics can average the distance between the source of a LIDAR output signal and the reflecting object determined from the first composite signal with the distance determined from the second composite signal and/or the electronics can average the radial velocity between the source of a LIDAR output signal and the reflecting object determined from the first composite signal with the radial velocity determined from the second composite signal.

In some instances, determining the LIDAR data for a sample region includes the electronics identifying one or more composite signals (i.e., the first composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (first composite signal or the second composite signal) with the larger amplitude as having the representative LIDAR data and can use the LIDAR data from identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 2 is described in the context of components being arranged such that the first comparative signals, the second comparative signals, the first reference signals, and the second reference signals each have the second polarization state, other configurations of the components in FIG. 2 can arranged such that the first composite signals result from combining a reference signal and a comparative signal of the same linear polarization state and the first composite signals result from combining a reference signal and a comparative signal of the same linear polarization state. For instance, the polarization rotator can be positioned along the first reference signal waveguide 46 rather than between the precursor comparative signal waveguide 65 and the first comparative signal waveguide 69. As another example, when the first reference signals and the second reference signals each has the first polarization state, the polarization rotator can be positioned along the second comparative signal waveguide 66.

The above system configurations result in the first portion of the LIDAR input signal (portion with the first polarization state) and the second portion of the LIDAR input signal (portion with the second polarization state) being directed into different composite signals. For instance, the system configuration can result in the first composite signals including more of the power from the first portion of the LIDAR input signal than the first composite signals and the second composite signals including more of the power from the second portion of the LIDAR input signal than the first composite signals. Alternately, the system configuration results in the first composite signals including more of the power from the second portion of the LIDAR input signal than the first composite signals and the second composite signals including more of the power from the first portion of the LIDAR input signal than the first composite signals. In some instances, the first portion of the LIDAR input signal has zero power or substantially zero power or the second portion of the LIDAR input signal has zero power or substantially zero power.

Figure 3:
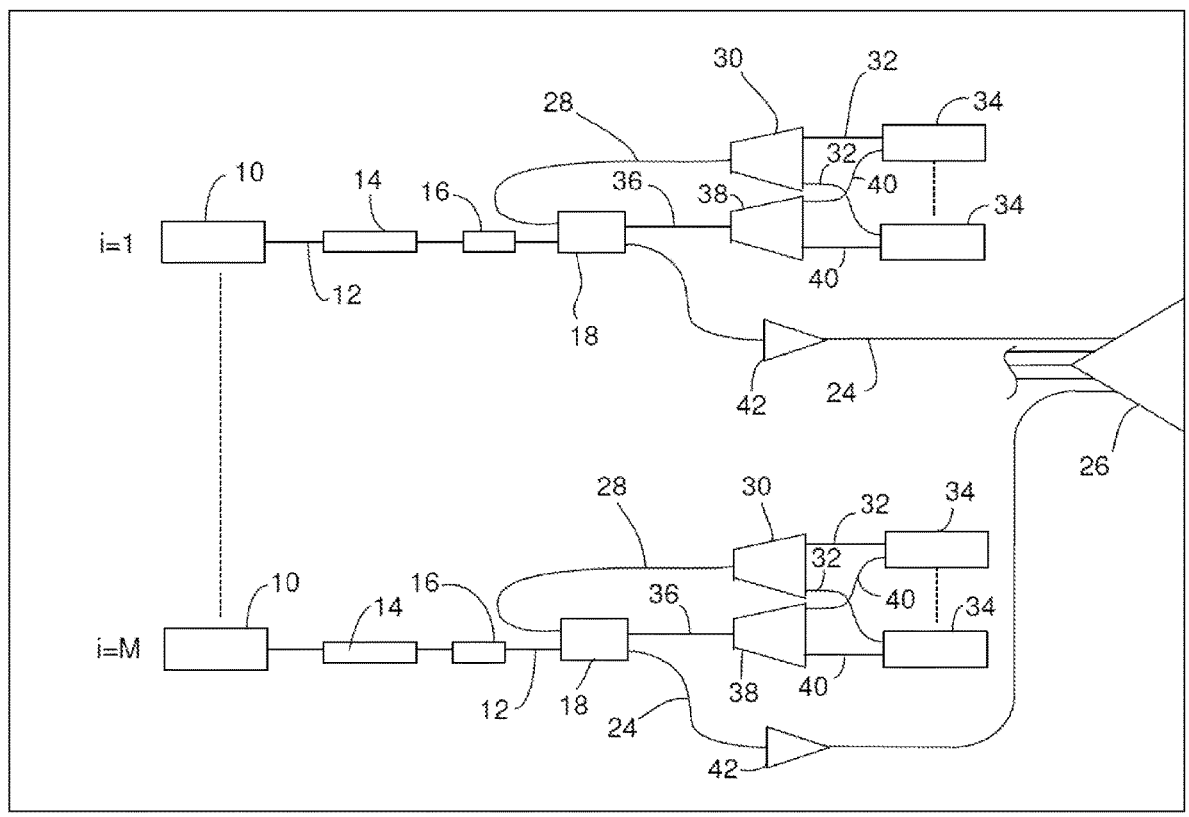
FIG. 3 is a schematic of another embodiment of a LIDAR system.

The above LIDAR systems can include more than one data branch associated with a LIDAR branch. For instance, the LIDAR system of FIG. 3 illustrates a LIDAR system where multiple light sources 10 provide channels to a LIDAR branch and multiple data branches receive light signals from the LIDAR branch.

Figure 4:
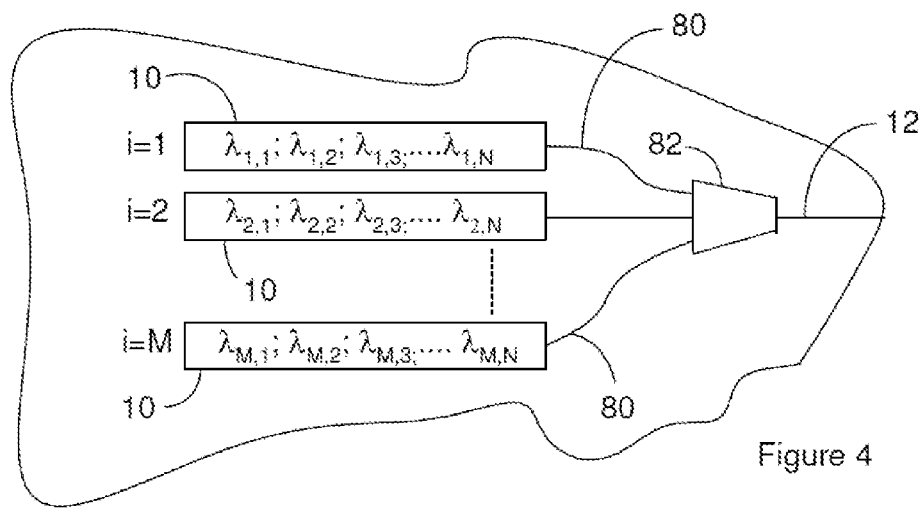
FIG. 4 illustrates multiple light sources configured to generate an outgoing light signal that includes multiple channels.

Although the above LIDAR systems are illustrated as having a single light source 10, the LIDAR system can have multiple light sources 10 as illustrated in FIG. 4. The light source 10 includes M light sources 10 that each generates N channels. The channels are each received on a channel waveguide 80. The channel waveguides carry the channels to a channel multiplexer 82 that combines the channels so as to form the outgoing light signal that is received on the utility waveguide 12.

In FIG. 4, each of the channels is labeled $\lambda_{ij}$ where i is the number of the light source 10 and is from 1 to M and j is the number of the channel for light source 10 j and is from 1 to N. As noted above, the light sources 10 can be configured such that the wavelengths of the channels are periodically spaced in that the wavelength increase from one channel to the next channel ($\Delta\lambda$) is constant or substantially constant. In some instances, the light sources 10 are configured such that channels with adjacent wavelengths are generated by different light sources 10. For instance, the light sources 10 can be configured such that $\lambda_{ij}=\lambda_o+((i-1)+(j-1)(M))(\Delta\lambda)$. Suitable light sources 10 for this configuration include, but are not limited to, comb lasers. In this configuration, the channel multiplexer can be a cyclic multiplexer designed with the wavelength spacing $((N-1)*\Delta\lambda)$ equal to a multiple of the Free Spectral Range (FSR) of the channel multiplexer. Accordingly, the channel multiplexer can be designed to cycle over the wavelength range $((N-1)*\Delta\lambda)$. A suitable cyclic multiplexer includes, but is not limited to, the 'colorless' AWG from Gemfire (8-Channel Cyclic Arrayed Waveguide Grating, 2018).

Suitable values for the number of light sources 10 (M) include, but are not limited to, values greater than or equal to 2, 4, or 8, and/or less than 16, 32, or 64. Suitable values for the number of channels provided by a light sources 10 (N) include, but are not limited to, values greater than or equal to 2, 4, or 8, and/or less than 16, 32, or 64. Suitable values for the wavelength increase from one channel to the next channel ($\Delta\lambda$) include, but are not limited to, values greater than or equal to 0.2 nm, 0.4 nm, or 0.6 nm, and/or less than 0.8 nm, 1.0 nm, or 1.5 nm. Suitable values for the wavelength of the channel with the shortest wavelength include, but are not limited to, values greater than or equal to 1.3 µm, 1.4 µm, or 1.5 µm, and/or less than 1.6 µm, 1.7 µm, or 1.8 µm. In one example, the LIDAR system includes M greater than or equal to 2, 4, or 8, and/or less than 16, 32, or 64; N greater than or equal to 2, 4, or 8, and/or less than 16, 32, or 64; and $\Delta\lambda$ greater than or equal to 0.2 nm, 0.4 nm, or 0.6 nm, and/or less than 0.8 nm, 1 nm, or 1.5 nm.

In some instances, the light sources 10 are configured such that at least a portion of the light sources 10 each generates two or more channels with adjacent wavelengths. For instance, the light sources 10 can be configured such that $\lambda_{ij}=\lambda_o+((j-1)+(i-1)(N))(\Delta\lambda)$. Suitable light sources 10 for this configuration include, but are not limited to, comb lasers. In this configuration, the channel multiplexer can be a broadband multiplexer with a bandwidth of at least $N\Delta\lambda$. Suitable broadband multiplexers include, but are not limited to, arrayed waveguide gratings (AWG) and thin film filters.

Figure 5:
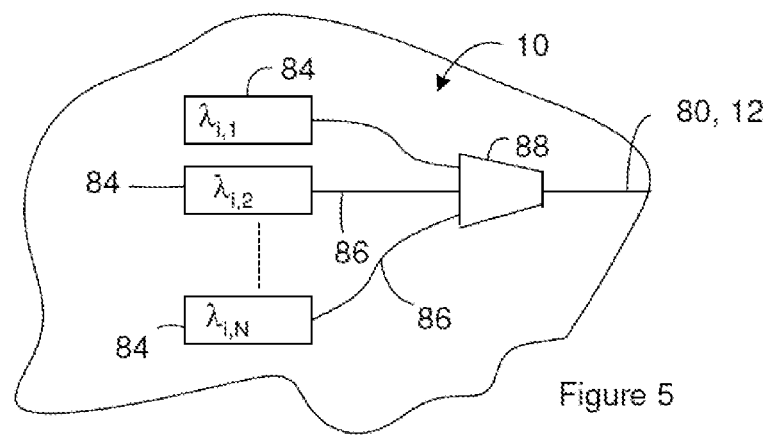
FIG. 5 illustrates a light source that includes multiple laser sources.

As noted above, one or more of the light sources 10 can be a comb laser. However, other constructions of the light source 10 are possible. For instance, FIG. 5 illustrates an example of a light source 10 that includes multiple laser sources 84. The light source 10 illustrated in FIG. 5 includes multiple laser sources 84 that each outputs one of the channels on a source waveguide 86. The source waveguides 86 carry the channels to a laser multiplexer 88 that combines the channels so as to form a light signal that is received on a channel waveguide or the utility waveguide 12. The electronics can operate the laser sources 84 so the laser sources 84 concurrently output each of the channels. Suitable lasers for use with a light source 10 constructed according to FIG. 5 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 6:
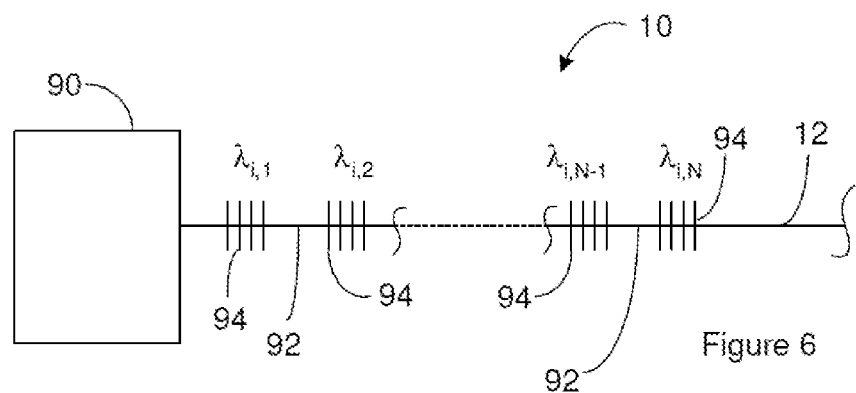
FIG. 6 illustrates one example of a structure configured to generate a light signal that includes multiple channels.

FIG. 6 illustrates another example of a possible light source 10 construction. The light source 10 includes a gain element 90 such as the gain element of a semiconductor laser. A gain waveguide 92 is optically aligned with the gain element so as to receive a light signal from the gain element. In some instances, the gain waveguide excludes the gain medium included in the gain element. For instance, the gain waveguide can be a ridge waveguide on a silicon-on-insulator chip. Multiple partial return devices 94 are positioned along the gain waveguide such that the partial return devices interact with the light signal.

During operation, electronics operate the gain element such that the gain medium outputs the light signal. The partial return devices 94 each passes a portion of the light signal. The portion of the light signal that the utility waveguide 12 receives from the partial return devices serves as the outgoing light signal. The partial return devices also return a portion of the light signal to the gain element such that the returned portion of the light signal travels through the gain element. The gain element can include a fully or partially reflective layer that receives returned portion of the light signal from the gain element and reflects the returned portion of the light signal back to the gain element allowing the returned portion of the light signal to amplify and lase. Accordingly, the light source 10 can be an external cavity laser.

The partial return devices can be configured such that each partial return device returns a different wavelength of light. For instance, the partial return devices can be configured such that the wavelength of each one of the channels that is to be output by the light source 10 is returned by at least one of the partial return devices. As a result, each of the desired channels will lase and be present in the outgoing light signal. Suitable partial return devices include, but are not limited to, Bragg gratings.

Figure 7B:
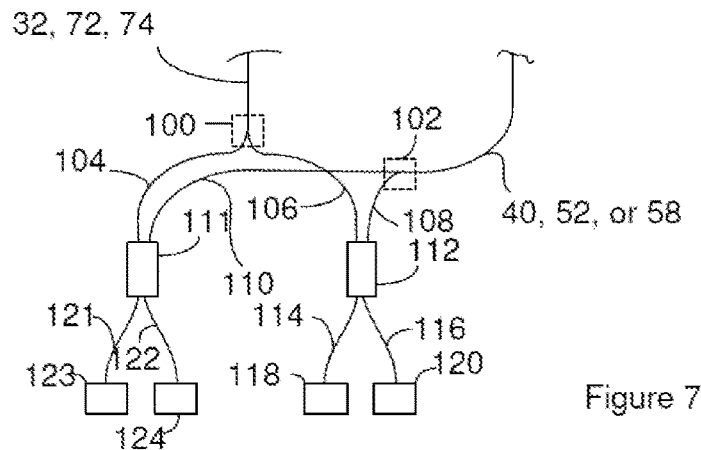
FIG. 7B provides a schematic of electronics that are suitable for use with a processing unit constructed according to FIG. 7A.
Figure 7B:
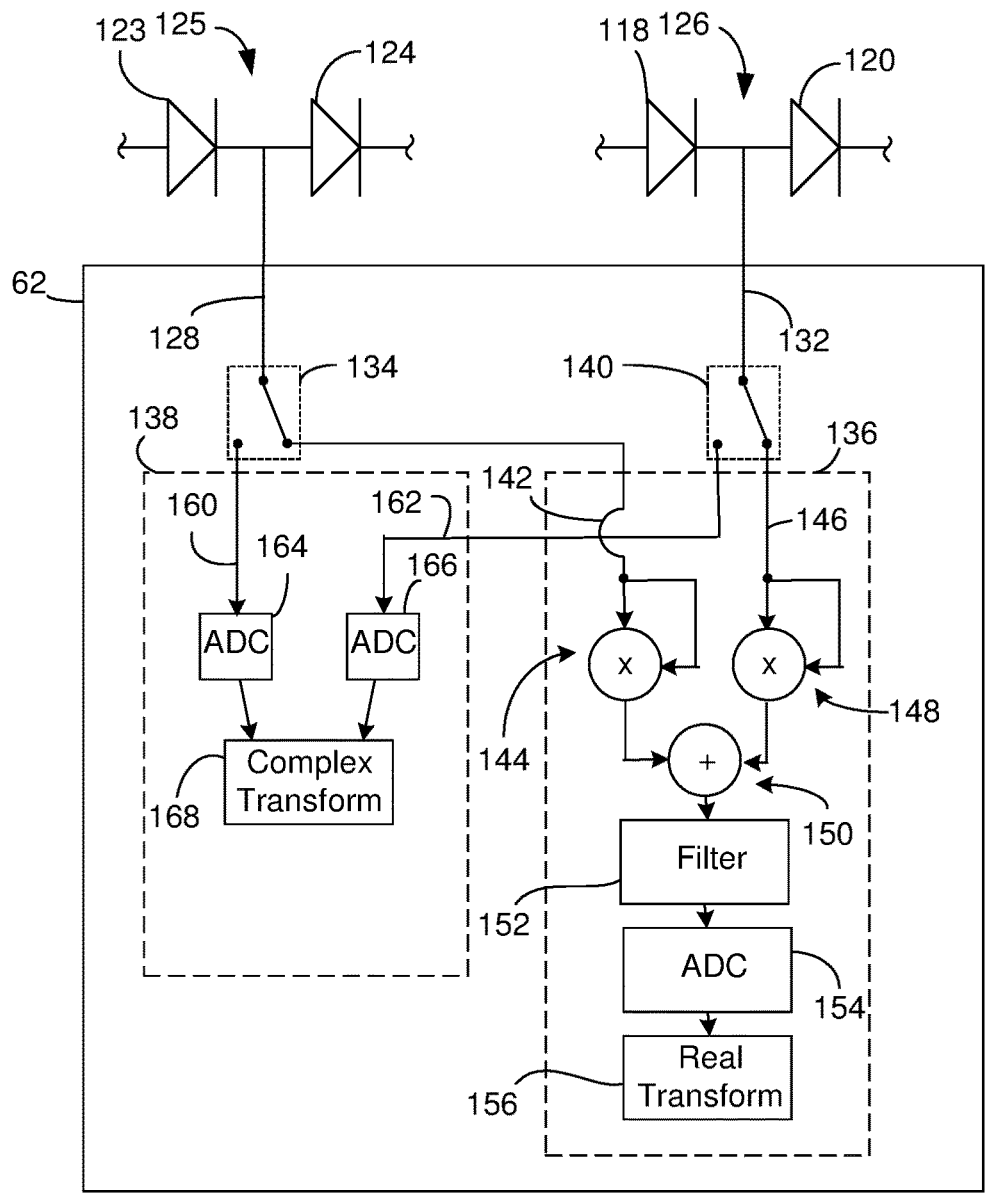

FIG. 7A through FIG. 7B illustrate an example of a suitable processing component for use in the above LIDAR systems. The illustrated processing component is suitable for use as any one of the processing components selected from the group consisting of a processing components 34, a first processing component 54, and a second processing component 60. The illustrated processing component includes a first splitter 102 that divides a reference signal carried on a reference waveguide 40, 52, or 58 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

A second splitter 100 divides the comparative signal carried on the comparative waveguide 30, 72, or 74 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 7B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 7B are included on the LIDAR system. In some instances, the components illustrated in the schematic of FIG. 7B are distributed between the LIDAR system and electronics located off of the LIDAR system.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal, i.e., the beating in the first composite signal and in the second composite signal.

The first data line 128 carries the first data signal to a first switch 134. The first switch can be in a first configuration where the first data signal is carried to a distance branch 136 or in a second configuration where the first data signal is carried to a velocity branch 138. In FIG. 7B, the first switch 134 is shown in the first configuration. The second data line 132 carries the second data signal to a second switch 140. The second switch can be in a first configuration where the second data signal is carried to the distance branch 136 or in a second configuration where the second data signal is carried to a velocity branch 138. In FIG. 7B, the second switch 140 is shown in the first configuration. A suitable switch for use as the first switch and/or second switch includes, but is not limited to, an electromechanical switch, and a solid state MOSFET or PIN diode switch.

The electronics operate the first switch and the second switch such that they are in the same configuration during the first period and during the second period. For instance, the electronics can operate the first switch and the second switch such that the first switch and the second switch are both in the first configuration during the first period and both in the second configuration during the second period. In this example, the first data signal and the second data signal are carried to the distance branch 136 during the first period and to the velocity branch 138 during the second period.

During operation of the LIDAR system, the generation of LIDAR data is divided into a series of cycles where LIDAR data is generated for each cycle. In some instances, each of the cycles corresponds to a different sample region in the field of view. Accordingly, different cycles can generate LIDAR data for different regions in a field of view.

The cycles can be performed such that the time for each cycle can be divided into different time periods that include a distance time period (first period) and a velocity time period (second period). The distance between the reflecting object and the LIDAR chip can be determined in the distance period and the radial velocity between the reflecting object and the LIDAR chip can be determined in the velocity period.

The electronics are configured to use the first data signal and the second data signal to determine or approximate at least the distance between the LIDAR system and the reflecting object. For instance, during the first period, the electronics can operate the modulator 14 so as to add chirp to the amplitude of the outgoing light signal and accordingly the LIDAR output signal. Adding chirp to the amplitude can include modulating the amplitude of the outgoing light signal such that the amplitude of the outgoing light signal is a function of a sinusoid. In one example, the amplitude of the outgoing light signal is modulated such that the amplitude of the outgoing light signal is a square root of a function that includes a sinusoid and/or is a square root of a sinusoid. For instance, the outgoing light signal can be modulated so as to produce a modulated outgoing light signal and LIDAR output signal mathematically represented by Equation 1: $(M+N*\cos(C*t+D*t^2))^{1/2} \cos(F*t)$ where M, N, C, D and F are constants, t represents time, M>0, N>0, and M≥N in order to prevent the radicand from becoming negative, C>0, D≠0. As will become evident below, F can be a function of the frequency of the LIDAR output signal ($f_c$). In Equation 1, F and C can be selected such that F>>C.

The distance branch includes a first distance branch line 142. During the first period, the first distance branch line 142 carries the first data signal to a first multiplier 144. In FIG. 7B, the first multiplier 144 is configured to square the amplitude of the first data signal and to output a first multiplied data signal. The distance branch includes a second distance branch line 146. During the first period, the second distance branch line 146 carries the second data signal to a second multiplier 148. In FIG. 7B, the second multiplier 148 is configured to square the amplitude of the second data signal and to output a second multiplied data signal. Suitable first multipliers and/or second multipliers include, but are not limited to, Radio Frequency (RF) such as a Gilbert cell mixer.

The distance branch includes an adder 150 that sums the first multiplied data signal and the second multiplied data signal. The adder outputs a summed data signal. Suitable adders include, but are not limited to, RF combiners including resistive or hybrid combiners. The distance branch includes a low-pass filter 152 that receives the summed data signal and outputs a beating data signal. The low-pass filter is selected to remove higher frequency contributions to the summed data signal that are artifacts of the mixing of the reference and return signals. The low-pass filter can be selected to have a bandwidth greater than or equal to: $f_{dmax}/2 + \alpha \tau_{0max}$ where $f_{dmax}$ represents the maximum level of the Doppler shift of the LIDAR input signal relative to the LIDAR input signal for which the LIDAR system is to provide reliable results, $\tau_{0max}$ represents maximum delay between transmission of the LIDAR output signal and the receipt of the LIDAR input signal, and a represents the rate of change in the frequency of the chirp added to the amplitude of the modulated outgoing light signal during the duration of the sample period (i.e. the first period). In some instances, a is determined from B/T where B represents the change in the frequency of the chirp added to the amplitude of the modulated outgoing light signal during the duration of the sample period and T is the duration of the sample period. In some instances, T is determined from: $T = \tau_{0max} + \lambda_c/(2\Delta v_{min})$ where $\lambda_c$ represents the wavelength of the outgoing light signal, $\Delta v_{min}$ represents velocity resolution and B can be determined from $B = cT/(2 \Delta R_{min} (T - \tau_{0max}))$ where c represents the speed of light and $\Delta R_{min}$ represents distance resolution. In some instances, the filter has a bandwidth greater than 0.1 GHz, 0.2 GHz or 0.3 GHz and/or less than 0.4 GHz, 0.5 GHz, or 1 GHz. Corresponding values for the sweep period (T) can be 10 µs, 8 µs, 4 µs, 3 µs, 2 µs, and 1 µs.

The distance branch includes an Analog-to-Digital Converter (ADC) 154 that receives the beating data signal from the filter. The Analog-to-Digital Converter (ADC) 154 converts the beating data signal from an analog form to digital form and outputs the result as a digital LIDAR data signal. As discussed above, the conversion of the beating data signal includes sampling the beating data signal at a sampling rate. The addition of the chirp to the amplitude of the LIDAR output signal substantially reduces or removes the effects of radial velocity from the beating of the composite signal and the resulting electrical signals. For instance, the frequency shift of the LIDAR output signal relative to the LIDAR input signal ("frequency shift," $\Delta f$) can be written as $\Delta f = \Delta f_d + \Delta f_s$ where $\Delta f_d$ represents the change in frequency due to the Doppler shift and $\Delta f_s$ is the change in frequency due to the separation between the reflecting object and the LIDAR system. The outgoing light signal can be modulated so as to produce a modulated outgoing light signal and accordingly, a LIDAR output signal that is also modulated, where the change in frequency due to the Doppler shift ($\Delta f_d$) is less than 10%, 5%, 1%, or even 0.1% of the Doppler shift that would occur from a sinusoidal LIDAR output signal serving as the LIDAR and having a constant amplitude and the same frequency as the modulated outgoing light signal and/or the LIDAR output signal. For instance, the outgoing light signal and/or the LIDAR output signal can be modulated so as to produce a modulated outgoing light signal and/or a LIDAR output signal where the change in frequency due to the Doppler shift ($\Delta f_d$) is less than 10%, 5%, 1%, or even 0.1% of the Doppler shift that would occur from a continuous wave serving as the LIDAR output signal and having the same frequency as the modulated outgoing light signal and/or the LIDAR output signal. In another example, the outgoing light signal and/or the LIDAR output signal are modulated so as to produce a modulated outgoing light signal and/or a LIDAR output signal where the change in frequency due to the Doppler shift ($\Delta f_d$) is less than 10%, 5%, 1%, or even 0.1% of the Doppler shift that would occur from the outgoing light signal before modulation (the unmodulated outgoing light signal) serving as the LIDAR output signal. These results can be achieved by increasing the value of the Equation 1 variable F relative to C. For instance, F can represent $2\pi f_c$ and C can represent $2\pi f_1$ where $f_1$ denotes the base frequency of the frequency-chirp in the amplitude of the modulated outgoing light signal. Accordingly, F can be increased relative to C by increasing the value of the frequency of the LIDAR output signal ($f_c$) relative to the chirp base frequency ($f_1$). As an example, $f_c$ and $f_1$ can be selected such that $f_c >> f_1$. In some instances, $f_c$ and $f_1$ are selected such that a ratio of $f_c:f_1$ is greater than 2:1, 10:1, $1 \times 10^4$: 1, $5 \times 10^4$, or $1 \times 10^5$: 1 and/or less than $5 \times 10^5$, $1 \times 10^6$, $5 \times 10^6$ or $5 \times 10^8$. Accordingly, the variables F and C can also have these same values for a ratio of F:C. The reduction and/or removal of the change in frequency due to the Doppler shift ($\Delta f_d$) from the frequency shift lowers the beat frequency and accordingly reduces the required sampling rate.

The distance branch includes a transform module 156 that receives the digital LIDAR data signal from the Analog-to-Digital Converter (ADC) 154. The transform module 156 is configured to perform a real transform on the digital LIDAR data signal so as to convert from the time domain to the frequency domain. This conversion provides an unambiguous solution for the shift in frequency of the shift of the LIDAR input signal relative to the LIDAR input signal that is caused by the distance between the reflecting object and the LIDAR system. A suitable real transform is a Fourier transform such as a Fast Fourier Transform (FFT). The classification of the transform as a real transform distinguishes the transform from complex transforms such as complex Fourier transforms. The transform module can execute the attributed functions using firmware, hardware or software or a combination thereof.

Since the frequency provided by the transform module does not have input from, or does not have substantial input from, a frequency shift due to relative movement, the determined frequency shift can be used to approximate the distance between the reflecting object and the LIDAR system. For instance, the electronics can approximate the distance between the reflecting object and the LIDAR system ($R_0$) using Equation 3: $R_0 = c \cdot \Delta f/(2\alpha)$ where $\Delta f$ can be approximated as the peak frequency output from the transform module, and c is the speed of light.

The velocity branch can be configured to use the first data signal and the second data signal to determine or approximate at least the radial velocity of the LIDAR system and the reflecting object. The LIDAR output signal with a frequency that is a function of time disclosed in the context of FIG. 1A through FIG. 2 can be replaced by a LIDAR output signal where the frequency of the LIDAR output signal is not a function of time. For instance, the LIDAR output signal can be a continuous wave (CW). For instance, during the second period, the modulated outgoing light signal, and accordingly the LIDAR output signal, can be an unchirped continuous wave (CW). As an example, the modulated outgoing light signal, and accordingly the LIDAR output signal, can be represented by Equation 2: G*cos(H*t) where G and H are constants and t represents time. In some instances, G represents the square root of the power of the outgoing light signal and/or H represents the constant F from Equation 1. In instances where the output of the light source has the waveform that is desired for the modulated outgoing light signal, the electronics need not operate the modulator 14 so as to modify the outgoing light signal. In these instances, the output of the light source(s) can serve as the modulated outgoing light signal and accordingly the LIDAR output signal. In some instances, the electronics operate the modulator 14 so as to generate a modulated outgoing light signal with the desired form.

Since the frequency of the LIDAR output signal is constant in the second period, changing the distance between reflecting object and LIDAR system does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the LIDAR output signal.

The velocity branch includes a first velocity branch line 160 and a second velocity branch line 162. During the second period, the first velocity branch line 160 carries the first data signal to an Analog-to-Digital Converter (ADC) 164 which converts the first data signal from an analog form to a digital form and outputs a first digital data signal. As discussed above, the conversion of the first data signal is done by sampling the first data signal at a sampling rate. The use of a continuous wave as the LIDAR output signal substantially removes the effects of distance between the reflecting object and LIDAR system from the beating of the composite signal and the resulting electrical signals. Accordingly, the beating frequency is reduced and the required sampling rate is reduced.

The second velocity branch line 162 carries the second data signal to an Analog-to-Digital Converter (ADC) 166 which converts the second data signal from an analog form to a digital form and outputs a second digital data signal. As discussed above, the conversion of the second data signal includes sampling the second data signal at a sampling rate. The use of a continuous wave as the LIDAR output signal substantially reduces or removes the effects of distance between the reflecting object and LIDAR system from the beating of the second composite signal and the resulting electrical signals. Accordingly, the beating frequency is reduced and the required sampling rate is reduced.

The sampling rate for the Analog-to-Digital Converter (ADC) 164 can be the same or different from the sampling rate for the Analog-to-Digital Converter (ADC) 166.

The velocity branch includes a transform module 168 that receives the first digital data signal from the Analog-to-Digital Converters (ADC) 164 and the second digital data signal from the Analog-to-Digital Converters (ADC) 166. Since the first data signal is an in-phase component and the second data signal its quadrature component, the first data signal and the second data signal together act as a complex velocity data signal where the first data signal is the real component and the second data signal is the imaginary component. As a result, the first digital data signal can be the real component of a digital velocity data signal and the second data signal can be the imaginary component of the digital velocity data signal. The transform module 168 can be configured to perform a complex transform on the digital velocity data signal so as to convert from the time domain to the frequency domain. This conversion provides an unambiguous solution for the shift in frequency of LIDAR input signal relative to the LIDAR input signal that is caused by the radial velocity between the reflecting object and the LIDAR system. A suitable complex transform is a Fourier transform such as a complex Fast Fourier Transform (FFT). The transform module can execute the attributed functions using firmware, hardware or software or a combination thereof.

Since the frequency shift provided by the transform module 168 does not have input from a frequency shift due to the separation distance between the reflecting object and the LIDAR system, and because of the complex nature of the velocity data signal, the output of the transform module 168 can be used to approximate the radial velocity between the reflecting object and the LIDAR system. For instance, the electronics can approximate the radial velocity between the reflecting object and the LIDAR system (v) using Equation 4: $v=c*f_d/(2*f_c)$ where $f_d$ is approximated as the peak frequency output from the transform module 168, c is the speed of light, and $f_c$ represents the frequency of the LIDAR output signal.

Additional components can be added to the schematic of FIG. 7B. For instance, when the LIDAR system generates multiple LIDAR output signals or is used with other LIDAR systems that generate LIDAR output signals (i.e., by means of frequency or wavelength division multiplexing, FDM/WMD), the LIDAR system can include one or more filters to remove interfering signals from the real and/or imaginary components of the beating data signal and/or of the velocity data signal. Accordingly, the LIDAR system can include one or more filters in addition to the illustrated components. Suitable filters include, but are not limited to, lowpass filters. In the case of the optical design, if the frequency of the interfering components falls outside the bandwidth of the balance detector(s), additional filtering may not be necessary as it may be effectively provided by the balance detector(s).

The sampling rate that is used during the first period and the second period can be selected to have a value that is greater than or equal to the larger of two values selected from the group consisting of the minimum sampling rate for the first period and the minimum sampling rate for the second period. For instance, during the first period the range of rates for the first period sampling rate ($f_{s1}$) can be determined by $f_{s1} \geq 2\alpha \tau_{0max}$ where $\tau_{0max}$ represents the maximum amount of time between the transmission of the LIDAR output signal and the receipt of the LIDAR input signal. During the second period the range of rates for the second period sampling rate ($f_{s2}$) can be determined by ($f_{s2}$)$\geq 2f_{dmax}$ where $f_{dmax}$ represents the maximum level of the Doppler shift of the LIDAR input signal relative to the LIDAR input signal for which the LIDAR system is to provide reliable results. The maximum is determined by the largest level for which the LIDAR system is to provide reliable results. Accordingly, the maximum distance generally corresponds to the distance for the field of view set in the LIDAR specifications and the maximum Doppler shift generally corresponds to the Doppler shift that would occur at the maximum radial velocity values set in the specifications. These two equations show that the minimum sampling rate for the first period is $2\alpha\tau_{0max}$ and the minimum sampling rate for the second period is $2f_{dmax}$. As a result, the sampling rate is selected to have a value that is greater than or equal to the larger of $2\alpha\tau_{0max}$ and $2f_{dmax}$. In other words, the sample rate used during the first period and the second period ($f_s$) is $f_s \geq \max(2\alpha\tau_{0max}, 2f_{dmax})$. In some instances, the sample rate used during the first period and the second period ($f_s$) is greater than or equal to 0.1 GHZ, 0.2 GHz, or 0.5 GHz and/or less than 1 GHz, 2 GHZ, or 4 GHZ.

Figure 8A:
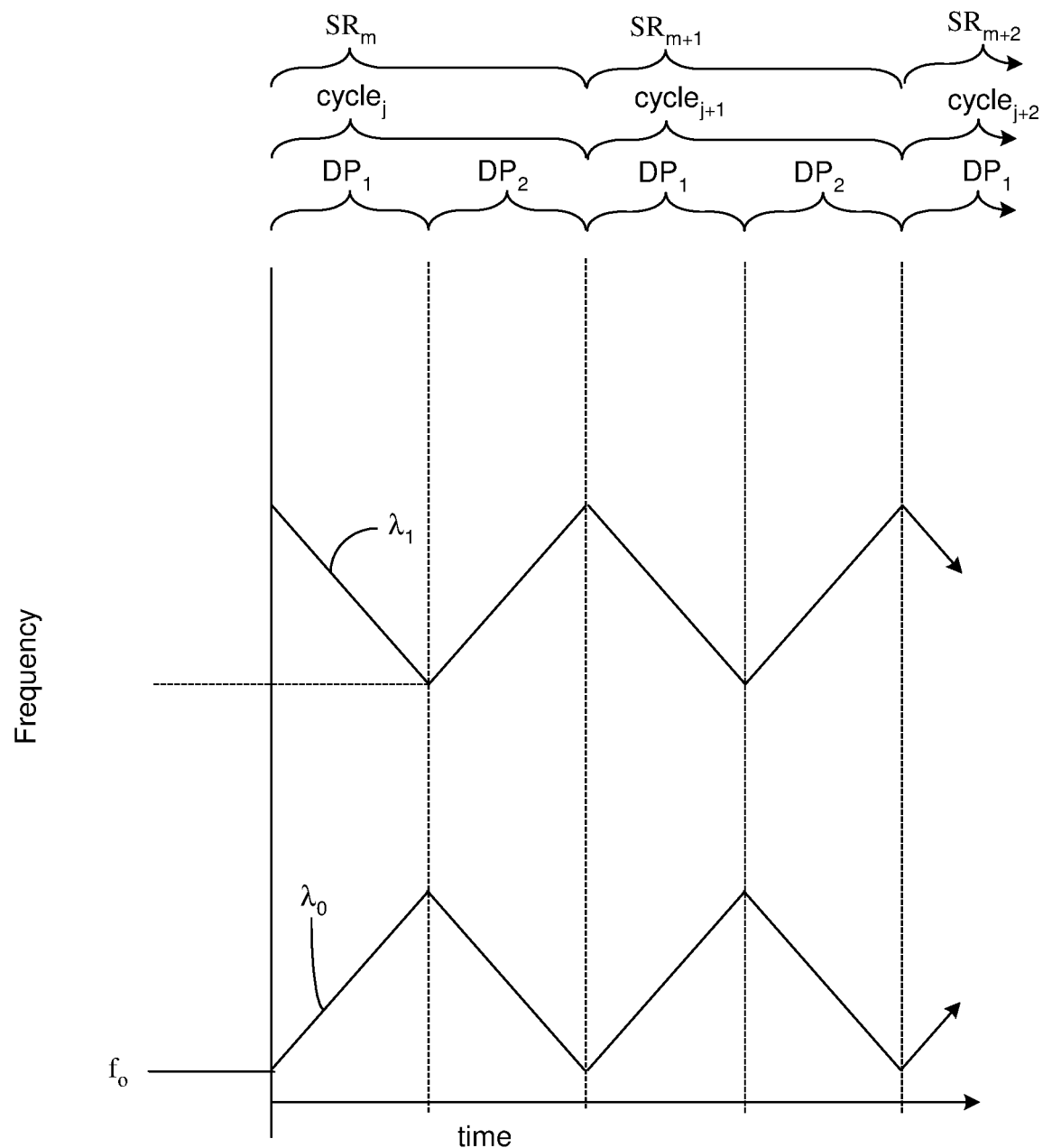
FIG. 8A through FIG. 8C illustrate another example of electronics that can be used with the processing unit of FIG. 7A.
Figure 8B:
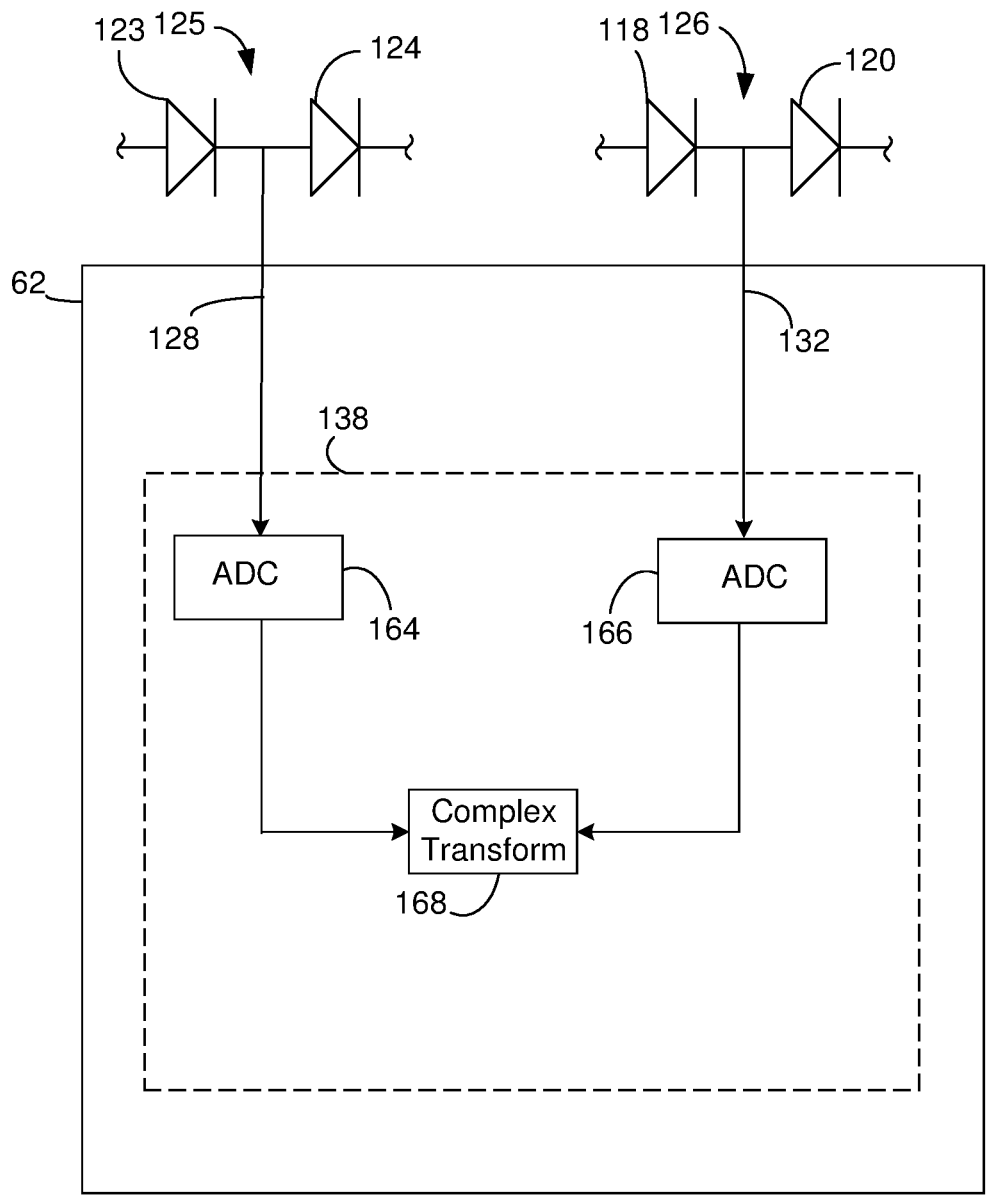
Figure 8C:
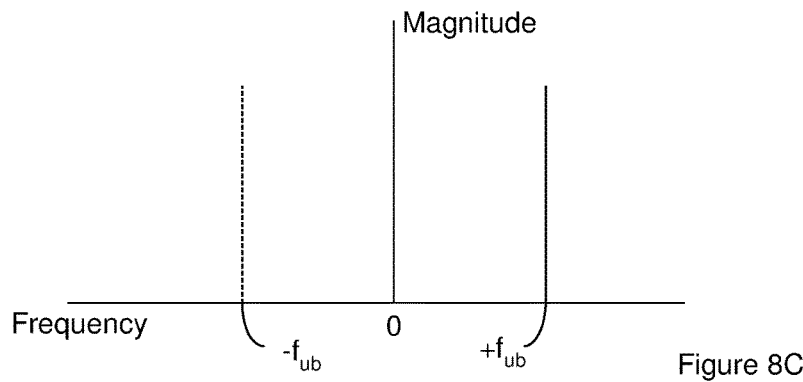

FIG. 8A through FIG. 8C illustrate another example of electronics that can be used with the processing unit of FIG. 7A. FIG. 8A presents an example of a scheme for tuning the LIDAR output signals. The frequency is shown for a sequence of several cycles that are each labeled $cycle_j$ through $cycle_{j+2}$. Each cycle includes K data periods that are each associated with a cycle index k and are labeled $DP_k$. In the example of FIG. 7A, each cycle includes two data periods labeled $DP_k$ with k=1 and k=2. Each of the illustrated cycles corresponds to one of M different sample regions that are each associated with a cycle index m and are labeled $SR_m$ through $SR_{m+2}$. Accordingly, in the illustrated example, the LIDAR data generated in each cycle is for a different sample region although other configurations are possible. Since there are no re-location periods illustrated, the LIDAR system is being operated with a continuous scan or without a scan.

FIG. 8A shows the tuning scheme for two different LIDAR output signals that each carries a different channel. Each of the different channels is illustrated by $\lambda_i$ and is associated with a channel index i. One of the channels is labeled $\lambda_0$ and another of the channels is labeled $\lambda_1$. The LIDAR output signals $\lambda_0$ and $\lambda_1$ each has an electrical field that is a function of a sinusoid with a frequency that changes with time. For instance, the electrical field of each channel is a function of a sinusoid with a frequency shown in FIG. 8A.

In one example, the electrical field for the LIDAR output signals for each of the channels shown in FIG. 8A can be a function of a sinusoid with a frequency represented by the following equations: (Equation 1) $f = f_i + 0.5 * \alpha_i * DP * [(-1)^j + 1] + (-1)^{(j-1)} \{t - [(j-1)(DP)]\}\alpha_i$ or (Equation 2) and $f = f_i + 0.5 * \alpha_i * DP * [(-1)^{(j-1)} + 1] - (-1)^{(j-1)} \{t - [(j-1)](DP)\}\alpha_i$ where $\alpha_i$ represents the rate of frequency change for channel i during the data period and $f_i$ represents the lowest frequency of channel i during a cycle (the base frequency). The variable t represents time where t=0 at the start of each new cycle and/or at the start of each $DP_k$. FIG. 8A illustrates an example where $\alpha_0 = \alpha_1$. In some instances, the values of $f_i$ are selected such that there is no overlap in the frequencies of the different LIDAR output signals as is illustrated in FIG. 8A. In one example, the electrical field for the LIDAR output signals is represented by the following mathematical equation: $N * \cos(2\pi * i * t + E * t^2)$ wherein N and E are constants, and E can be zero or non-zero, N·0, and, in some instances, f is the frequency provided by Equation 1 or Equation 2. In FIG. 8A, the channel labeled $\lambda_0$ has an electrical field that is a function of a sinusoid with a frequency represented by Equation 1, and 21 has an electrical field that is a function of a sinusoid with a frequency represented by Equation 2.

The number of processing components 34 included in the LIDAR system can match the number of LIDAR output signals that each carries a different channel. As an example, a LIDAR system for use with the tuning scheme of FIG. 8A can be constructed according to FIG. 1A with two processing components 34. Although FIG. 8A illustrates the frequency versus time waveform for two different channels, the LIDAR system can be configured to output more than two LIDAR output signals that each carries a different channel. Additionally, or alternately, although FIG. 8A illustrates the direction of the frequency change for different channels in the same data period as being different, the direction of the frequency change for different channels in the same data period can be the same. For instance, tuning the frequency of a comb laser changes the frequency of each channel output from the comb laser in the same direction.

FIG. 8B provides another example of a schematic of electronics that are suitable for use with a processing unit constructed according to FIG. 7A. The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e., the beating in the first composite signal and in the second composite signal.

The electronics 62 include a transform mechanism 138 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 138 includes a first Analog-to-Digital Converter (ADC) 164 that receives the first data signal from the first data line 128. The first Analog-to-Digital Converter (ADC) 164 converts the first data signal from an analog form to a digital form and outputs a first digital data signal. The transform mechanism 138 includes a second Analog-to-Digital Converter (ADC) 166 that receives the second data signal from the second data line 132. The second Analog-to-Digital Converter (ADC) 166 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 138 includes a transform component 168 that receives the complex data signal. For instance, the transform component 168 receives the first digital data signal from the first Analog-to-Digital Converter (ADC) 164 as an input and also receives the second digital data signal from the first Analog-to-Digital Converter (ADC) 166 as an input. The transform component 168 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The transform component 168 can execute the attributed functions using firmware, hardware or software or a combination thereof.

The solid line in FIG. 8C provides an example of the output of the transform mechanism when a Complex Fourier transform converts the input from the time domain to the frequency domain. The solid line shows a single frequency peak. The frequency associated with this peak is used by the electronics as the shift in frequency of LIDAR input signal relative to the LIDAR output signal is caused by the radial velocity between the reflecting object and the LIDAR chip and/or the distance between the reflecting object and the LIDAR chip. FIG. 8C also includes a second peak illustrated by a dashed line. Prior methods of resolving the frequency of the LIDAR input signal made use of real Fourier transforms rather than the Complex Fourier transform technique disclosed above. These prior methods output both the peak shown by the dashed line and the solid line. Accordingly, the prior methods output multiple different frequencies that are both associated with a single object in the sample region in that each of the associated frequencies would not be present if the object were removed from the sample region. As noted above, when using LIDAR applications, it can become difficult to identify the correct peak. Since the above technique for resolving the frequency generates a single solution for the frequency, the ambiguity with the frequency solution has been resolved.

The electronics use the single frequency represented by the solid line in FIG. 8C to generate LIDAR data. For instance, the following equation applies during a data period where the electronics increase the frequency of the LIDAR output during the data period such as occurs with the LIDAR output signal 2 of FIG. 8A during the data periods labeled $DP_1$: $+f_{ub}=-f_d+\alpha\tau_0$ where $f_{ub}$ is the frequency provided by the transform component, fa represents the Doppler shift ($f_d=2Vf_c/c$) where $f_c$ is the frequency of the LIDAR output signal at the start of the data period (i.e., t=0), v is the radial velocity between the reflecting object and the LIDAR chip where the direction from the reflecting object toward the chip is assumed to be the positive direction, and c is the speed of light, a represents the rate at which the frequency of the outgoing light signal is increased or decreased during the period, and to is the roundtrip delay (time between the LIDAR output signal exiting from the LIDAR chip and the associated LIDAR input signal returning to the LIDAR chip) for a stationary reflecting object. The following equation applies during a data period where electronics decrease the frequency of the LIDAR output signal during the data period such as occurs with the LIDAR output signal $\lambda_0$ of FIG. 8A during the data periods labeled $DP_2$: $-f_{db}=-f_d-\alpha\tau_0$, where fab is the frequency provided by the transform mechanism. In these two equations, $f_d$ and $\tau_0$ are unknowns. These two equations are solved for the two unknowns $f_d$ and $\tau_0$. The values of $f_{db}$ and $f_{ub}$ that are substituted into the solution come from the same channel and accordingly the same processing units (labeled 34 in FIG. 1A and FIG. 1B), but during different data periods in the same cycle. Since the cycles is associated with a sample region in the field of view, the solution yields the values of $f_d$ and $\tau_0$ for a sample region in the field of view. The radial velocity for that sample region can then be determined from the Doppler shift ($v=c*f_d/(2f_c)$) and the separation distance for that sample region can be determined from $c*\tau_0/2$. As a result, the LIDAR data for a sample regions is determined for a single LIDAR output signal (channel) that illuminates the sample region.

As noted above, when the LIDAR data for a single sample region in the field of view is present in multiple different composite signals (i.e., the first composite signals and the second composite signal disclosed in the context of FIG. 2), determining the LIDAR data for the sample region can include the electronics combining the LIDAR data from different composite signals (i.e., the first composite signals and the second composite signal). An alternative to combining LIDAR data is to combine signals that are present before the LIDAR data is extracted. For instance, the electronics can add the digital frequency domain signals output from different transform components 168. As an example, the electronics can add the digital frequency domain signals output from the electronics that receive signals from a first processing component 54 shown in FIG. 2 with the digital frequency domain signals output from the electronics that receive signals from a second processing component 60 shown in FIG. 2. In these instances, the first processing component 54 and the second processing component are associated with the same sample region in that the digital frequency domain signals each carries LIDAR data from the same sample region. The summing of the digital frequency domain signals can improve the signal to noise ratio in the magnitude versus frequency curve results (i.e., FIG. 8C). As a result, the algorithm that the electronics use to identify the peak in the magnitude versus frequency curve can have an improved reliability. The electronics can use the resulting peak frequency ($f_{ub}$ or $f_{db}$) to extract the LIDAR data as described above.

As discussed above, the LIDAR system can output more than two LIDAR output signals that each carries a different channel. For instance, the LIDAR system can output three LIDAR output signals that have frequency versus time waveforms according to FIG. 8A. The LIDAR output signals can be concurrently directed to the same sample region in a field of view or different portions of the LIDAR output signals can be directed to different sample regions in the field of view. Additionally, the LIDAR output signals can be sequentially scanned across the sample regions such that each sample region is illuminated by at least one of the LIDAR output signals.

The above description of the LIDAR system operation assumes that a modulator is present on the utility waveguide 12; however, in some instances, the modulator is optional. In these instances, the electronics can operate the light source(s) 10 so as to tune the frequency of the LIDAR output signal. Since one or more of the light sources can output multiple channels, tuning the frequency of one light source can concurrently tune the frequency of multiple channels and accordingly multiple LIDAR output signals. For instance, tuning the frequency of a comb laser concurrently tunes the frequency of the channels output from that comb laser and accordingly tunes the LIDAR output signals that carry the channels output from that comb laser. The electronics can tune the frequency of a light source such as a comb laser by tuning the electrical current driven through the comb laser. In some instances, the electronics can tune the frequency of a light source such as a comb laser by 10 GHz, 100 GHz, or 1 THz.

Figure 9:
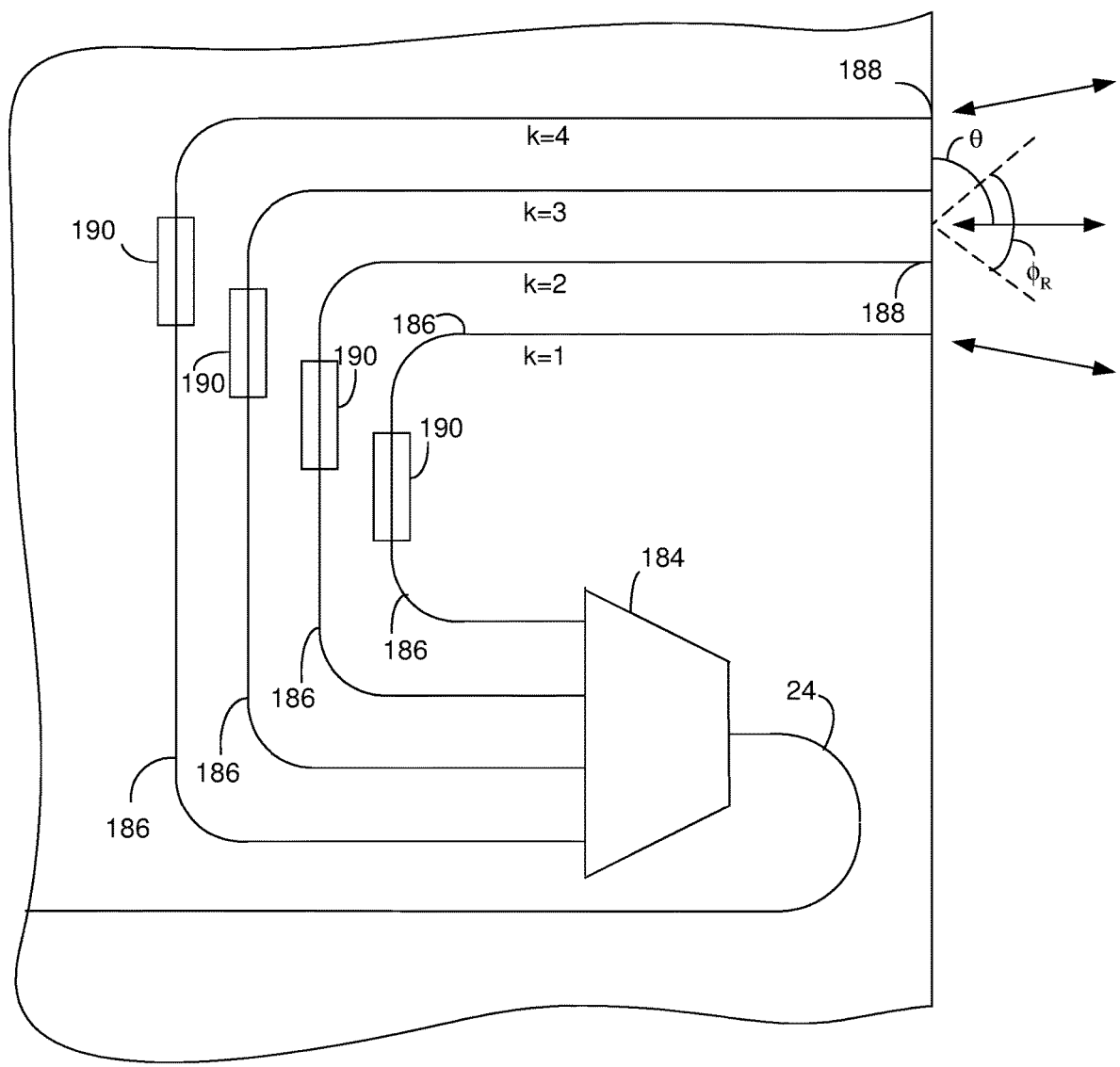
FIG. 9 illustrates an example of a demultiplexing component that includes beam steering capability.

FIG. 9 illustrates an example of a suitable demultiplexing component 26 that includes beam steering capability. The demultiplexing component 26 includes a splitter 184 that receives the outgoing light signal from the LIDAR signal waveguide 24. The splitter divides the outgoing light signal into multiple output signals that are each carried on a steering waveguide 186. Each of the steering waveguides ends at a facet 188. The facets are arranged such that multiple output signals that exit the chip through the facets combine to form each of the LIDAR output signals. The LIDAR output signals can travel away from the LIDAR system through free space.

The splitter and steering waveguides can be constructed such that there is not a phase differential between output signals at the facet of adjacent steering waveguides. For instance, the splitter can be constructed such that each of the output signals is in-phase upon exiting from the splitter and the steering waveguides can each have the same length. Alternately, the splitter and steering waveguides can be constructed such that there is a linearly increasing phase differential between output signals at the facet of adjacent steering waveguides. For instance, the steering waveguides can be constructed such that the phase of steering waveguide number j is $f_o+(j-1)f$ where j is an integer from 1 to N and represents the number associated with a steering waveguide when the steering waveguides are sequentially numbered as shown in FIG. 6, f is the phase differential between neighboring steering waveguides when the phase tuners (discussed below) do not affect the phase differential, and $f_o$ is the phase of the output signal at the facet of steering waveguide k=1. Because the channels can have different wavelengths, the values of f and $f_o$ can each be associated with one of the channels. In some instances, this phase differential is achieved by constructing the steering waveguides such that the steering waveguides have a linearly increasing length differential. For instance, the length of steering waveguide j can be represented by $l_o+(k-1)\Delta l$ where k is an integer from 1 to K and represents the number associated with a steering waveguide when the steering waveguides are sequentially numbered as shown in FIG. 9, $\Delta l$ is the length differential between neighboring steering waveguide, and $L_o$ is the length of steering waveguide k=1. Because $\Delta l$ is a different percent of the wavelength of different channels included in the output signals, each of the different LIDAR output signals travels away from demultiplexing component, LIDAR system, and LIDAR chip in a different direction ($\theta$). When the steering waveguides are the same length, the value of $\Delta l$ is zero and the value of f is zero. Suitable $\Delta l$ include, but are not limited to, $\Delta l$ greater than 0, or 5 and/or less than 10, or 15 μm. Suitable f include, but are not limited to, f greater than $0\pi$, or $7\pi$ and/or less than $15\pi$, or $20\pi$. Suitable N include, but are not limited to, N greater than 10, or 500 and/or less than 1000, or 2000. Suitable splitters include, but are not limited to, star couplers, cascaded Y-junctions and cascaded 1×2 MMI couplers.

A phase tuner 190 can be positioned along at least a portion of the steering waveguides. Although a phase tuner is shown positioned along the first and last steering waveguide, these phase tuners are optional. For instance, the chip need not include a phase tuner on steering waveguide j=1.

The electronics can be configured to operate the phase tuners so as to create a phase differential between the output signals at the facet of adjacent steering waveguides. The electronics can operate the phase tuners such that the phase differential is constant in that it increases linearly across the steering waveguides. For instance, electronics can operate the phase tuners such that the tuner-induced phase of steering waveguide number k is $(k-1)\gamma$ where k is an integer from 1 to N and represents the number associated with a steering waveguide when the steering waveguides are sequentially numbered as shown in FIG. 9, $\gamma$ is the tuner-induced phase differential between neighboring steering waveguides. Accordingly, the phase of steering waveguide number k is $f_o+(k-1)f+(k-1)\gamma$. FIG. 9 illustrates the chip having only 4 steering waveguides in order to simplify the illustration, however, the chip can include more steering waveguides. For instance, the chip can include more than 4 steering waveguides, more than 100 steering waveguides, or more than 1000 steering waveguides and/or less than 10000 steering waveguides.

The electronics can be configured to operate the phase tuners so as to tune the value of the phase differential $\gamma$. Tuning the value of the phase differential $\gamma$ changes the direction that the LIDAR output signals travel away from the chip ($\theta$). Since the phase differential $\gamma$ will be different for each channel, the LIDAR output signals travel away from the chip in different directions. Accordingly, the electronics can concurrently scan the LIDAR output signals by changing the phase differential $\gamma$. The range of angles over which the LIDAR output signal can be scanned is ØR and, in some instances, extends from $\phi_v$ to $-\phi_v$ with $\phi=0°$ being measured in the direction of the LIDAR output signal when $\gamma=0$. When the value of $\Delta l$ is not zero, the length differential causes diffraction such that light of different wavelengths travels away from chip in different directions ($\theta$). Accordingly, there may be some spreading of the outgoing light signal as it travels away from the chip. Further, changing the level of diffraction changes the angle at which the outgoing light signal travels away from the chip when $\gamma=0°$. However, providing the steering waveguides with a length differential ($\Delta l \neq 0$) can simplify the layout of the steering waveguides on the chip.

Additional details about the construction and operation of a demultiplexing component 26 constructed according to FIG. 9 can be found in U.S. Provisional Patent Application Ser. No. 62/680,787, filed on Jun. 5, 2018, and incorporated herein in its entirety.

The above LIDAR systems can be integrated on a single chip. A variety of platforms can be employed for a chip that includes the above LIDAR systems. A suitable platform includes, but is not limited to, a silicon-on-insulator wafer. One or more of the above components and/or portions of the above components can be integral with the chip or can be placed on the chip with technologies such as flip-chip bonding technologies. For instance, a light source 10 can include a gain element and one or more other components such as waveguides. The waveguide can be integral with the chip and the gain element can be a component that is separate from the chip but attached to the chip with a flip-chip bonding. Alternately, the above LIDAR system can be constructed with discrete components. For instance, all or a portion of the waveguides can be optical fibers connecting discrete components. Alternatively, one or more portions of the LIDAR system can be integrated on a chip while other portions are discrete components. For instance, the utility waveguide 12 can be or include an optical fiber that provides optical communication between a light source 10 and an optical chip that includes the remainder of the LIDAR system.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a light source configured to generate an outgoing light signal that includes multiple channels, each of the channels having a different wavelength;
a waveguide configured to guide multiple different LIDAR input signals that each carries a different one of the channels,
wherein the waveguide is configured to guide at least a portion of the outgoing light signal;
multiple light-combining components that each generates a different composite light signal such that each of the different composite light signals includes a comparative light signal combined with a reference light signal, the comparative light signals each including light from a different one of the LIDAR input signals,
the LIDAR input signals each includes light that was reflected by an object located apart from the system and that was included in one of the channels, and
the reference light signals do not include light that was reflected by the object but include light from one of the channels, and
each of the composite light signals carrying light from a different one of the channels and being generated such that the reference light signal and the LIDAR input signal included in the composite light signal includes light from the same channel.

2. The system of claim 1, wherein the light source includes a comb laser.

3. The system of claim 1, wherein the composite light signals include first composite light signals and second composite light signals,
a first portion of the LIDAR input signal being light of a first polarization state and a second portion of the LIDAR input signal being light of a second polarization state that is different from the first polarization state,
the first composite light signals including light from the first portion of the LIDAR input signal, and
the second composite light signals including light from the second portion of the LIDAR input signal.

4. The system of claim 3, wherein the first composite light signals do not substantially include light from the second portion of the LIDAR input signal and the second composite light signals do not substantially including light from the first portion of the LIDAR input signal.

5. The system of claim 1, wherein the light source is one of multiple light sources included in the system, the light sources each configured to generate a light signal that includes a plurality of the channels, the outgoing light signal combining the light signals from the multiple light sources; and
the channels in the outgoing light signal with adjacent wavelengths are generated by different light sources.

6. The system of claim 1, further comprising: electronics configured to tune the light source such that the frequency of each channel changes concurrently.

7. The system of claim 6, wherein the light source is a comb-laser.

8. The system of claim 1, further comprising: a demultiplexing component that receives the outgoing light signal configured to separate the outgoing light signal into multiple LIDAR output signals that are each at a different wavelength and exit from the demultiplexing component traveling in different directions through free space.

9. The system of claim 8, wherein the different LIDAR output signals are each directed to a different sample region in a field of view.

10. The system of claim 8, further comprising: electronics configured to tune a direction that the LIDAR output signals travel away from the demultiplexing component.

11. The system of claim 1, wherein the waveguide is configured to guide the LIDAR input signals to a signal director and the LIDAR system includes a utility waveguide configured to guide the outgoing light signal to the signal director.

12. The system of claim 11, wherein the signal director is an optical coupler.

13. The system of claim 11, wherein the signal director is a crossover switch.

14. The system of claim 11, wherein the waveguide terminates at a demultiplexing component that receives the portion of the outgoing light signal from the waveguide.

\* \* \* \* \*